(12) United States Patent
Dizdarevic (10) Patent No.: US 9,803,696 B2
(45) Date of Patent: Oct. 31, 2017

(54) CLAMPING ARRANGEMENT AND EJECTOR AND CONICAL RING FOR THE SAME

(71) Applicant: Bikon-Technik GmbH, Neuss (DE)

(72) Inventor: Zlatko Dizdarevic, Neuss (DE)

(73) Assignee: Bikon-Technik GmbH (DE)

( * ) Notice: Subject to any disclaimer, the term of this patent is extended or adjusted under 35 U.S.C. 154(b) by 690 days.

(21) Appl. No.: 14/040,699

(22) Filed: Sep. 29, 2013

(65) Prior Publication Data

US 2014/0050523 A1 Feb. 20, 2014

Related U.S. Application Data

(62) Division of application No. 12/671,216, filed as application No. PCT/EP2008/006358 on Aug. 1, 2008, now Pat. No. 8,562,243.

(30) Foreign Application Priority Data

Aug. 1, 2007 (DE) .................... 20 2007 010 709 U (51) Int. Cl.
*F16D 1/09* (2006.01)
*F16D 1/094* (2006.01)

(52) U.S. Cl.
CPC ...... *F16D 1/094* (2013.01); *F16D 2001/0945* (2013.01); *Y10T 403/1641* (2015.01); *Y10T 403/635* (2015.01); *Y10T 403/7056* (2015.01); *Y10T 403/7069* (2015.01)

(58) Field of Classification Search
CPC ......... Y10T 403/7052; Y10T 403/7056; Y10T 403/7062; Y10T 403/7064; Y10T 403/7066; Y10T 403/7067; Y10T 403/7069; Y10T 403/1641; Y10T 403/64;
(Continued)

(56) References Cited

U.S. PATENT DOCUMENTS

| 3,957,381 A | 5/1976 | Schafer |
| 4,268,185 A | 5/1981 | Mullenberg |
| 4,396,310 A | 8/1983 | Mullenberg |

(Continued)

FOREIGN PATENT DOCUMENTS

| DE | 2329940 | 1/1975 |
| DE | 3215618 | 10/1983 |

(Continued)

*Primary Examiner* — Jonathan Masinick
(74) *Attorney, Agent, or Firm* — Rankin, Hill & Clark LLP (57) ABSTRACT

A clamping arrangement for the force-fit connection of an outer component to an inner component including an inner conical ring and an outer conical ring wherein one of the rings has leadthrough bores clamping screws and the other ring has threaded bores for the clamping screws to brace the rings against one another via the conical peripheral surfaces, and against the inner and outer component arrangement. At least one leadthrough bore having an ejector thread for an ejector screw and the diameter of the ejector thread being greater than the diameter of the clamping screw. The arrangement including an ejector ring with an ejector bore for the leadthrough of the ejector screw which can be screwed into the ejector thread and an ejector surface for engaging a clamping screw head that is incompletely screwed into the corresponding threaded bore for the transmission of an ejector force onto the clamping screw.

7 Claims, 7 Drawing Sheets

(58) Field of Classification Search
CPC ............. Y10T 403/642; Y10T 403/645; Y10T 403/648; F16D 1/093–1/097
See application file for complete search history.

(56) References Cited

U.S. PATENT DOCUMENTS

| | | |
|---|---|---|
| 4,471,846 A | 9/1984 | Mullenberg |
| 4,557,621 A | 12/1985 | Mullenberg |
| 4,624,597 A | 11/1986 | Johnson et al. |
| RE32,881 E | 2/1989 | Muellenberg |
| 5,639,176 A | 6/1997 | Mullenberg |
| 6,309,136 B1 | 10/2001 | Kellenberger et al. |
| 6,368,012 B1 | 4/2002 | St. Onge et al. |
| 6,736,027 B2 | 5/2004 | Ostling et al. |
| 7,156,575 B2 | 1/2007 | Weiss et al. |
| 7,309,187 B2 | 12/2007 | Swanson |
| 2005/0244221 A1 | 11/2005 | Seaman |
| 2009/0087258 A1 | 4/2009 | McCabe |

FOREIGN PATENT DOCUMENTS

| | | |
|---|---|---|
| DE | 3343446 | 4/1985 |
| DE | 3804673 | 8/1989 |
| DE | 29603922 | 8/1997 |
| WO | 02/12743 A1 | 2/2002 |

CLAMPING ARRANGEMENT AND EJECTOR AND CONICAL RING FOR THE SAME

This application is a divisional of U.S. patent application Ser. No. 12/671,216, Filed Jan. 1, 2010 which has issued as U.S. Pat. No. 8,562,243 on Oct. 22, 2013 and, which claims priority to and the benefit of the filing date of International Application No. PCT/EP2008/006358, filed Aug. 1, 2008, which application claims priority to and the benefit of the filing date of German Application No. 20 2007 010 709.9, filed Aug. 1, 2007, all of which are hereby incorporated by reference into the specification of this application.

FIELD OF INVENTION

The invention relates to a clamping arrangement and an ejector ring and a conical ring for the same and, more particularly, to a clamping arrangement for the force-fit connection of an outer component arrangement to an inner component arrangement; and components therefor.

BACKGROUND OF THE INVENTION

Such detachable clamping arrangements are used for the force-fit connection of two components, particularly a shaft and a hub. For this purpose, they are positioned between the shaft and the hub, and then clamped. They allow the transmission of high torques and, as the case may be, axial thrusts. The advantages include, in addition to the capacity to transmit very high torques, a high rotational precision, and freedom from play during alternating stress application. The fields of use of such clamping connections cover a broad spectrum because of their advantages, comprising, for example, the mounting of ship propellers, couplers, chain wheels and flywheels, and the like.

The assembly of such clamping arrangements is simple. For this purpose, two conical rings having conical peripheral surfaces that face each other are introduced into a radial gap between a shaft and a hub to be connected to the shaft. By mutually shifting the conical rings in the axial direction toward each other, the outer diameter of the outer ring of the conical rings is enlarged, while the inner diameter of the interior of the conical rings is decreased. The shift occurs by means of clamping screws, which brace the expanding outer conical ring against the hub, the compressed inner conical ring against the shaft, and the two conical rings against one another. The bracing of the conical rings against one another via the conical peripheral surfaces here is self-locking.

During disassembly, the self locking must be overcome. For this purpose, it is known from DE 1190266 C1 to provide threaded ejector bores in one of the conical rings in the peripheral direction between the clamping screw bores. Ejector screws can be screwed into these threaded ejector bores that meet the other conical ring at bore-free places, and allow the ejection of the same in the axial direction. However, this solution is associated with the disadvantage that the threaded ejector bores limit the number of clamping screws that can be used in the peripheral direction. For example, if four threaded ejector bores are provided, then correspondingly fewer clamping screws can be used along the periphery. This leads, particularly in the case of small diameters, to the inability of such clamping arrangements to be able to transmit sufficiently high torques.

In order not to reduce the number of clamping screws, it is known from DE 29603922 U1 and DE 3343446 C1 to provide such threaded ejector bores in each case between two clamping screw bores. However, this solution weakens the mechanical load capacity of the conical ring, because the webs between the clamping screw bores and the threaded ejector bores become very small. In addition, the result is an inhomogeneous distribution of stress.

A clamping arrangement is known from DE 32 15 618 A1 and GB 9 04 551 A where in each case the two conical rings are braced against one another by means of a pressure ring.

DE 38 04 673 C1 relates to an external clamping system, in which, from the outside, a hollow shaft is compressed against an internal shaft, while the invention relates to an intermediate clamping system which is arranged between an outer and an inner component, with force transmission in the radial direction.

In the clamping arrangements known from DD 83 046 A, DE 73 02 286 U, DE 87 03 454 U1 and DE 33 43 446 C1, through bore-holes and threaded bores are arranged adjacent to each other in a known way.

DE 296 03 922 U1 shows an external clamping system which functions as a flange connection.

SUMMARY OF THE INVENTION

The invention is therefore based on the problem of producing a clamping arrangement, as well as an ejector ring and a conical ring for it, which are capable of transmitting high torques while being easy to disassemble.

Accordingly, a clamping arrangement is provided, in which several through bore-holes for clamping screws have an ejector thread for screwing in ejector screws. Thus the already provided through bore-holes for clamping screws are according to the invention also used for ejector screws. Additional ejector screw threaded bores are no longer necessary. The number of clamping screws usable for bracing the clamping arrangement therefore remains unchanged. Moreover, no additional bores between the bores for the clamping screws are necessary, so that the conical ring is not weakened. According to the invention, it is thus possible to use the largest possible number of clamping screws to increase the maximum transferable torque, where the clamping arrangement is not weakened by additional bores, and disassembly can be done in a simple way.

The clamping arrangement is flexible with regard to the number and design of the conical rings; it can be used in every situation where at least two conical rings are braced against one another, and against an inner and an outer component arrangement. In the simplest case, the inner (outer) component arrangement consists of a shaft (hub); however, it can have additional components that are attached to the shaft (inserted into the hub) or connected in another way with the latter, where the inner (outer) conical ring is then in contact with said components.

Thus, for example, a conventional conical ring with a ring flange can be used, in which the bores are provided for leadthrough of a clamping screw. The ring flange can extend radially away from the inner component arrangement and it can be brought to bear axially against the outer component arrangement. As a result, a stable bracing is made possible with the additional conical ring, which is pulled onto the ring flange. Optionally, the ring flange extends in the direction toward the inner component arrangement. This design is also common in clamping arrangements.

The mutually applied surfaces of the inner conical ring and of the inner component arrangement can be in the shape of a circular cylinder or of a cone. The same applies for the mutually applied surfaces of the outer conical ring and of the outer component arrangement. As a result, an optimal adaptation to the geometry of the outer and/or inner component arrangement is possible.

The invention can also be used with a clamping arrangement in which several, in particular two inner and/or two outer conical rings are provided in such a way that they are axially adjacent to each other.

The bores are here advantageously distributed equally along the periphery. This has the result of a homogeneous stress distribution. It is advantageous here for each second, third or fourth bore to have an ejector thread for the leadthrough of a clamping screw, so that the ejector screws are also distributed equally, and the ejector surfaces arranged in between are not overloaded.

The invention furthermore provides an ejector ring for such a clamping arrangement, with bores for the leadthrough of ejector screws which can be screwed into the ejector thread of a conical ring, and with ejector surfaces which are provided peripherally between the bores, and which can be brought to bear against clamping screw heads of partially loosened clamping screws, for the transmission of an ejector force to the clamping screw heads as the ejector screws are tightened. The ejector ring can be used with a multitude of clamping arrangements of compatible diameter and compatible number of ejector threads.

It is advantageous to provide tool bores in the ejector ring for the leadthrough of a screw tool through an ejector surface. As a result, clamping screws can be loosened further or screwed in again without again having to take off the ejector ring. The result is a simple way to adjust the clamping screws during the ejection.

The tool bores advantageously have a smaller diameter than the bores for leadthrough of the ejector screws, so that a sufficient ejector surface for a contact with the clamping screw head remains.

The ejector ring as well as the conical rings can be closed or interrupted along their periphery by a slit. The slit allows adaptability of the periphery during clamping.

The ejector ring can be subdivided along its periphery into at least two sections. As a result, it is lighter and can also be used when the circumstances of the construction make it difficult or impossible to slip a closed ring on a shaft.

Finally, the invention provides a conical ring for such a clamping arrangement, with bores for the leadthrough of clamping screws which can be attached by screw connection to an additional adjacent conical ring of the clamping arrangement, where a bore for the leadthrough of a clamping screw has an ejector thread for an ejector screw with a diameter that is greater than the diameter of another bore which lacks an ejector thread. As a result, it is no longer necessary to provide additional bores for ejector screws.

Depending on the construction of the clamping arrangement, the conical ring can be an inner or an outer conical ring, i.e., in contact with the inner component arrangement or with the outer component arrangement.

These and other objects, aspects, features, developments and advantages of the invention of this application will become apparent to those skilled in the art upon a reading of the Detailed Description of Embodiments set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DETAILED DESCRIPTION OF INDIVIDUAL EMBODIMENTS

Figure 1:
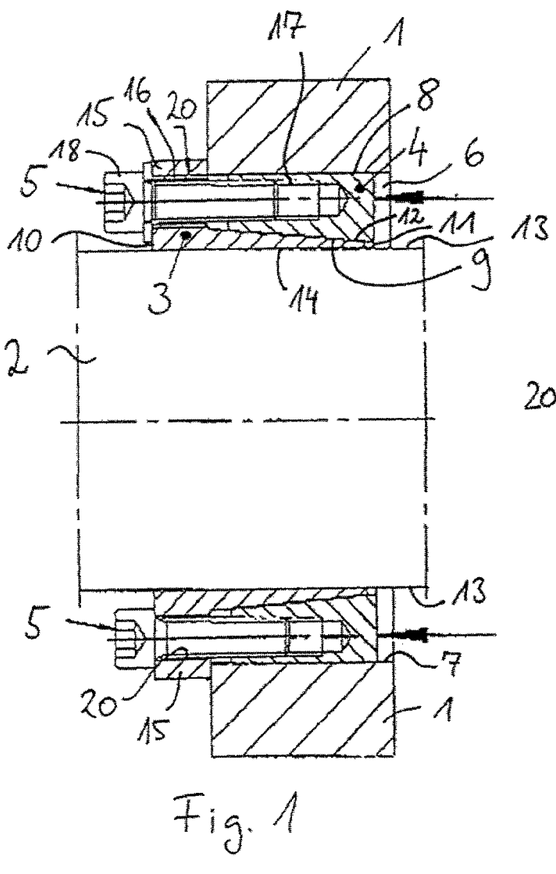
FIG. 1 is a cross section through conical rings that are braced by means of clamping screws between a shaft and a hub.
Figure 2:
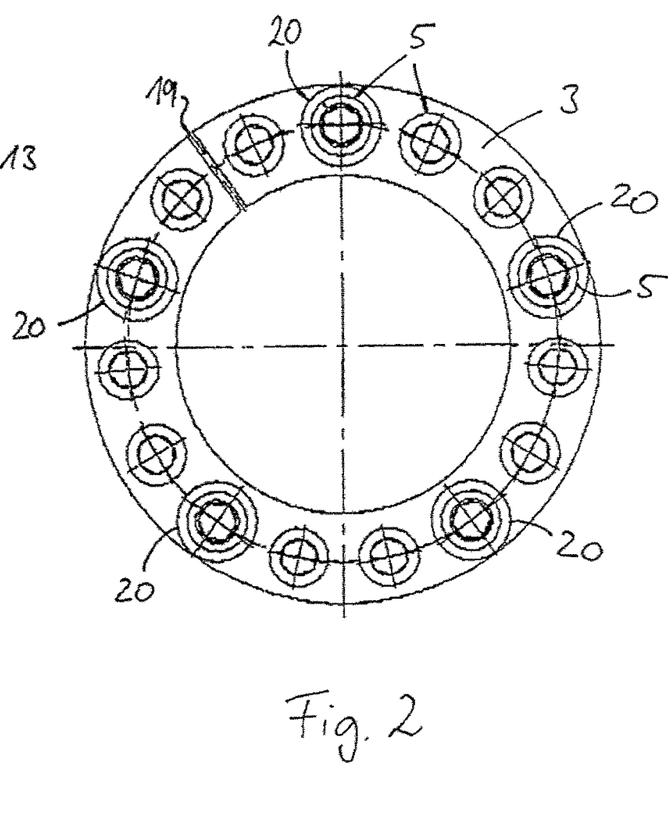
FIG. 2 shows a conical ring of the clamping arrangement of FIG. 1 in a top view.

Referring now to the drawings wherein the showings are for the purpose of illustrating preferred and alternative embodiments of the invention only and not for the purpose of limiting same, FIGS. 1 and 2 shows a clamping arrangement to obtain a force-fit connection between a hub 1 and a shaft 2. More particularly, shown are an inner and an outer conical ring 3, 4 that are braced by means of clamping screws 5 against one another, and against the hub 1 and the shaft 2.

For this purpose, the hub 1 has a recess 6, into which the shaft 2 with attached conical rings 3, 4 is inserted. The recess 6 forms a cylindrical surface 7 that faces the shaft 2, and is designed here advantageously in the shape of a circular cylinder. The cylindrical surface 7 can also be designed to be conical, or in another advantageous way.

A peripheral surface 8, here also circular cylindrical, of the outer conical ring 4 comes in contact with the cylindrical surface 7. A conical peripheral surface 9 faces away from the circular cylindrical peripheral surface 8 and faces toward the inner conical ring 3.

The conicity causes a decrease of the inner diameter of the outer conical ring 4, from its end surface 10 facing the clamping screw 5 toward the opposite end surface 11. The outer diameter remains unchanged. The radial thickness of the outer conical ring 4 increases accordingly in the clamping screw direction from the end surface 10 to the end surface 11.

The conical peripheral surface 9 comes in contact with an also conical peripheral surface 12 of the inner conical ring 3. The peripheral surfaces 9, 12 here have the same conical angle, but they rise in opposite axial directions. A circular cylindrical peripheral surface 14 of the inner conical ring 3, which surface comes into contact with to the shaft 2, faces away from the conical peripheral surface 12 of the inner conical ring 3 and toward a cylindrical peripheral surface 13 of the shaft 2.

The inner conical ring 3 has a peripheral ring flange 15, which is supported in the axial direction against the hub 1. The bores 16 for leadthrough of the clamping screws 5 extend through the ring flange 15. In the extension of the bores 16, threaded bores 17 are provided in the outer conical ring 4, for screwing in the clamping screws 5.

For the assembly of the clamping arrangement represented in FIG. 1, the conical rings 3, 4 are first introduced into the annular space between the hub 1 and the shaft 2. Subsequently, the clamping screws 5 are lead through the bores 16 in the ring flange 15 of the inner conical ring 3, and screwed into the threaded bores 17 of the outer conical ring 4. The clamping screw heads 18 of the clamping screws 5 here bear against the ring flange 15, so that during tightening the conical rings 3, 4 are moved in the axial direction toward each other. As a consequence of the rise in the mutually applied conical peripheral surfaces 9, 12, the outer conical ring 4 expands in the radial direction, while the inner conical ring 3 is compressed in the radial direction. The result is a bracing tension in the radial direction, namely between the in each case paired, mutually applied, circular cylindrical peripheral surfaces 7, 8, conical peripheral surfaces 9, 12, and circular cylindrical, peripheral surfaces 13, 14. The two conical rings 3, 4 are thus braced against one another, and against the hub 1 and the shaft 2. The result is a force-fit connection between the hub 1 and the shaft 2 through the conical rings 3, 4. The force-fit connection allows the transmission of torque from the shaft 2 to the hub 1 and vice versa. In addition, axial forces between the shaft 1 and the hub 1 are transferable.

The bores 16 for the clamping screws 5 are preferably distributed equally along the periphery of the inner conical ring 3, see FIG. 2. The bores 16 have a diameter which can be slightly greater than the diameter of the clamping screws 5. As a result, a radial clearance of the clamping screws 5 in the bores 16 is created which allows a radial compression of the inner conical ring 3 during the bracing. In addition, a slit 19 can be provided that interrupts the conical ring 3 in the peripheral direction, so that the latter can be compressed more easily.

At least one of the bores 16 in the inner conical ring 3 has an ejector thread 20. Purely as an example, five ejector threads 20 are illustrated in FIG. 2. The ejector threads 20 are inner threads into which the clamping screws 5 cannot be screwed because of the larger diameter of the bore 16. Instead, after the removal of the clamping screws 5 from the bores 16 with the ejector thread 20, ejector screws 21 can be screwed into the ring flange 15 of the inner conical ring 3, see FIG. 3. This is carried out for the disassembly of the clamping set, which is described below.

Figure 3:
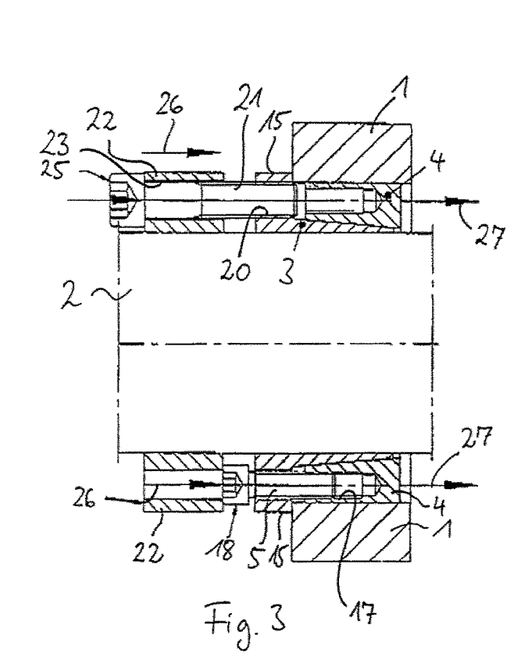
FIG. 3 is a cross section through a clamping arrangement with attached ejector ring.

An ejector ring 22 is used to loosen the bracing between the hub 1, the external conical ring 4, the inner conical ring 3, and the shaft 2.

Figure 4:
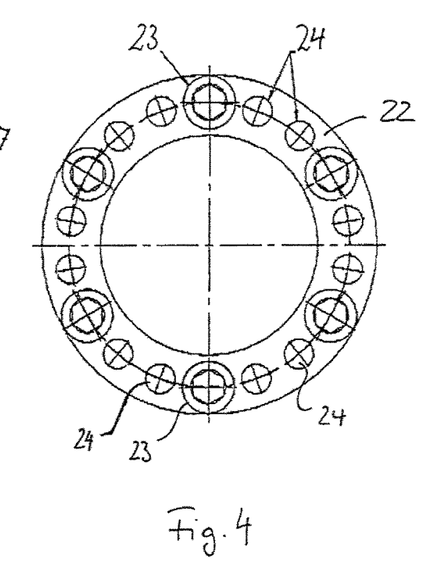
FIG. 4 shows the ejector ring of FIG. 3 in atop view.

The ejector ring 22 can be slid onto the shaft 2, and: has bores 23 for leadthrough of the ejector screws 21 at locations that can be aligned with the bores 16 in the ring flange 15 that have the ejector thread 20. The ejector ring 22 lacks a bore at those locations which in this position face the bores 20 without ejector threads; optionally, it is possible to provide there, as represented in FIG. 4, tool bores 24 for a turning tool. The tool bores 24 have a diameter which is smaller than the diameter of the clamping screw heads 18. As a result, on the one hand a force transmission from the ejector ring 22 to the clamping screws 18 is ensured, and on the other hand it is made possible to loosen or tighten the clamping screws 5 by means of a tool, such as a screwdriver, for example, in the mounted state of the ejector ring 22.

For the disassembly, the clamping screws 5 are removed from the bores 16 with the ejector thread 20. The other clamping screws 5 are loosened, i.e., they are advantageously unscrewed from the threaded bores 17 of the outer conical ring 4 by the same amount. The clamping screw head 18 of these loosened clamping screws 5 is then at a distance from the ring flange 15, as represented in FIG. 3. Subsequently, the ejector ring 22 is placed against the clamping screw heads 18 of the loosened clamping screws 5, and screwed via the ejector screws 21 to the inner conical ring 3. As a result, via the ejector screw heads 25, the ejector ring 22 is moved in the axial direction onto the inner conical ring 3, which is illustrated by the arrow 26. This in turn results in a force on the clamping screw heads 18 of the loosened clamping screws 5. The clamping screws 5 transmit this force via the threaded bores 17 to the outer conical ring 4, which is thus pushed out in the axial direction along the arrows 27 out of the braced state between the inner conical ring 3 and the hub 1. The clamping connection is thus loosened.

Figure 5:
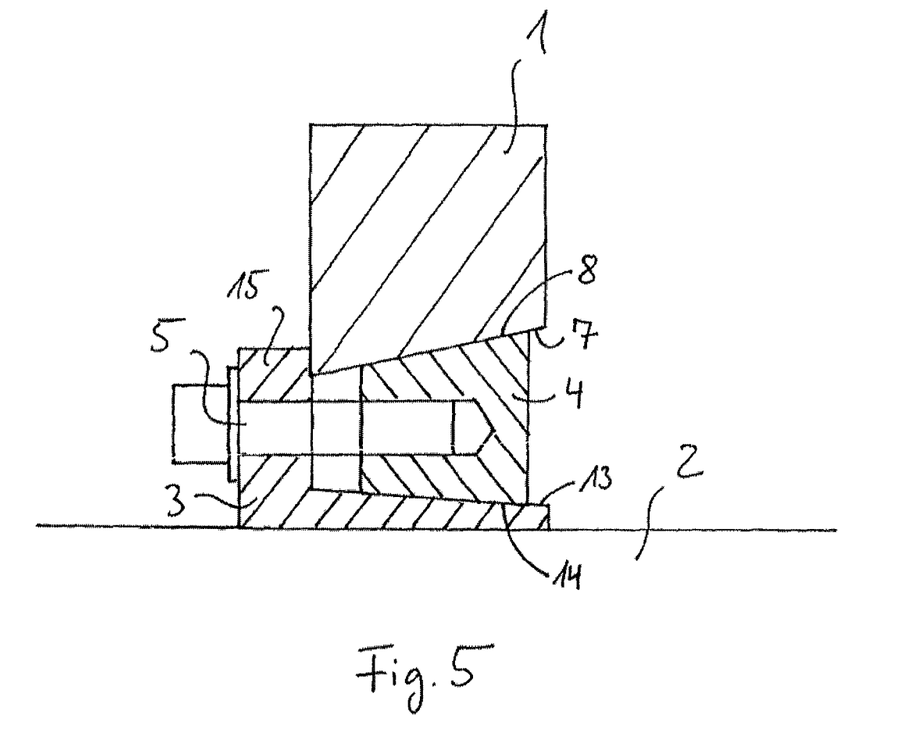
FIG. 5 is a cross section through another clamping arrangements according to another aspect of the invention.

FIG. 5 illustrates that the peripheral surfaces 7, 8 of the hub 1 or of the outer conical ring 4 and/or the peripheral surfaces 13, 14 of the shaft 2 or of the inner conical ring 3 do not have to be circular cylindrical; rather, as represented in the example, they can also have a conical shape. The conical angle of the peripheral surfaces 7, 8 or 13, 14 is here identical pairwise.

Figure 6:
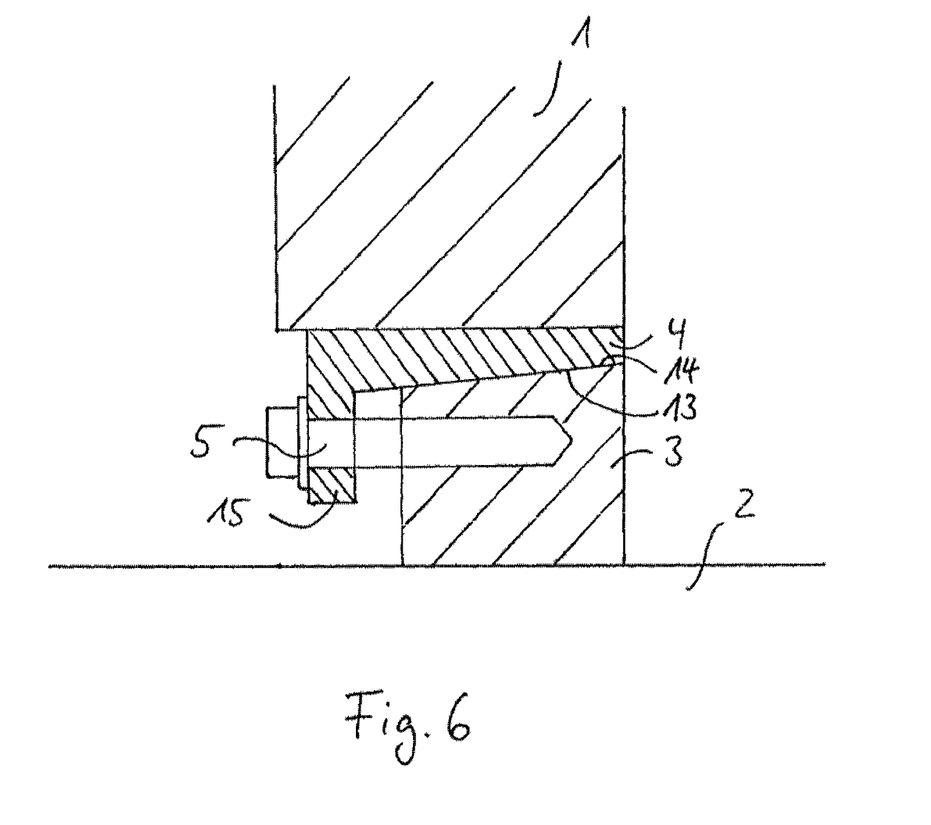
FIG. 6 is a cross section through yet another clamping arrangements according to another aspect of the invention.

FIG. 6 illustrates, in addition to the conical peripheral surfaces 13, 14, that the roles of the inner and outer conical rings 3 and 4, respectively, can be exchanged with respect to the embodiment of FIG. 1. Here, the outer conical ring 4 has the ring flange 15. The ring flange 15 extends radially in the direction toward the shaft 2, and is at a distance from the latter; however, it can also be radially braced against the latter. The construction of the ring flange 15 with the bores 16, which in part have ejector threads 20, corresponds to the construction of the ring flange 15 represented in FIG. 1. The embodiment represented in FIG. 6 can be disassembled in the same way as illustrated in FIG. 3.

Figure 7:
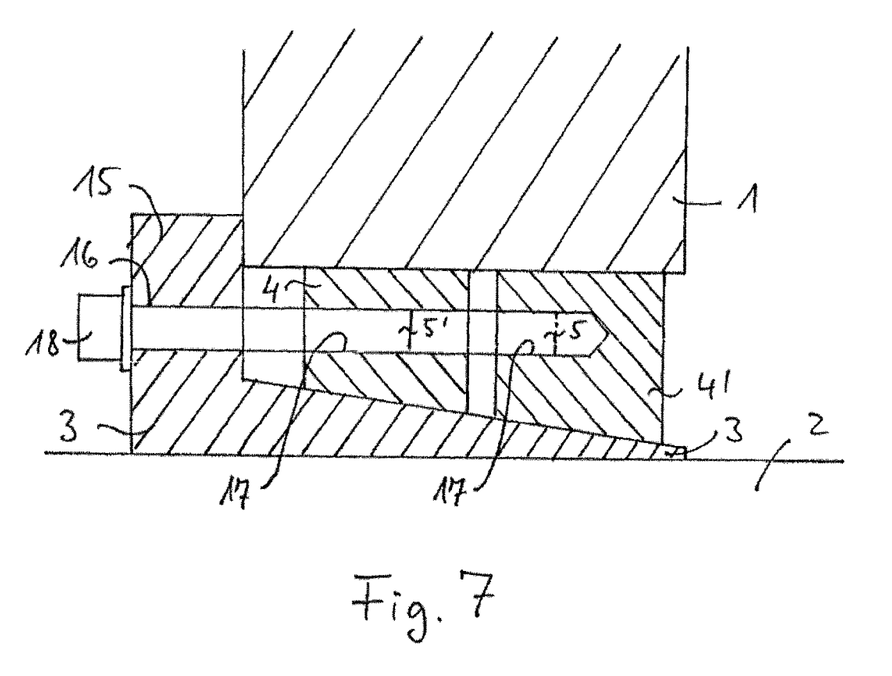
FIG. 7 is a cross section through a further clamping arrangements according to another aspect of the invention.

In the embodiment according to FIG. 7, two outer conical rings 4, 4' are arranged axially adjacent to each other. In such a clamping arrangement, several of the clamping screws 5, as represented, extend through the bores 16 in the ring flange 15 and in the inner conical ring 4, into the threaded bores 17 in the conical ring 4'. Other clamping screws 5' are shorter, and extend through the bores 16 in the ring flange 15 into the threaded bores 17 in the conical ring 4. These shorter clamping screws 5' do not reach the conical ring 4'. Several of the bores 16 in the ring flange 15 through which the clamping screws 5 extend, as well as several of the bores 16 in the ring flange 15 through which the shorter clamping screws 5' extend, here have ejector threads 20.

For the disassembly, first the longer clamping screws 5 that are inserted in the bores 16 with ejector threads 20 are removed. The remaining longer clamping screws 5, but not the shorter clamping screws 5', are then loosened slightly, for example, by one or two turns, in order to produce, as represented in FIG. 3, a separation between the clamping screw head 18 and the ring flange 15. Subsequently the ejector ring 22 is put on and pulled with the ejector screws 21 onto the ring flange where it presses against the loosened longer clamping screws 5, so that the conical ring 4' is loosened out of the braced state. The ejector ring 22 is removed, the remaining longer clamping screws 5 are screwed out of the conical ring 4', and the conical ring 4' is pulled out of the clamping arrangement. Subsequently, the conical ring 4 is loosened. This is effected as in the embodiment example of FIGS. 1-4. For this purpose, the shorter clamping screws 5' are first removed that extend through the bores with ejector threads 20. The remaining shorter clamping screws 5' are unscrewed by a certain amount in order to produce a separation between the clamping screw head 18 and the ring flange 19, as represented in FIG. 3. Then the ejector ring 22 is applied against the clamping screw heads 18 of the loosened shorter clamping screws 5' and pulled with the ejector screws 21 axially in the direction onto the ring flange 15. As a result, the outer conical ring 4 is also released from the bracing.

Figure 8:
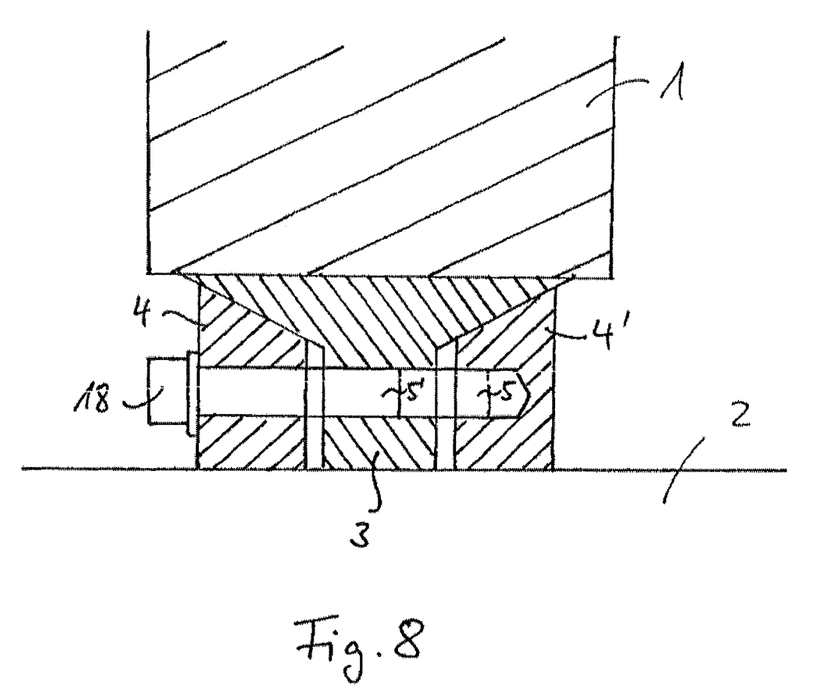
FIG. 8 is a cross section through yet a further clamping arrangements according to another aspect of the invention.

In the embodiment represented in FIG. 8, an outer conical ring 3 which has a T-shaped cross section is provided. The arms of the T are conical here with narrowing from the middle toward the outside. On both sides of the middle bar of the T-shaped conical ring 3, which bar is optionally at a distance from the shaft 2, an inner conical ring 4, 4' is in each case provided. The conical angles of the inner conical rings 4, 4' are adapted to the conical angles of the arms of the T-shaped outer conical ring 3. The conical rings 4, 4' can be braced via clamping screws 5, 5' against the conical ring 3 and the shaft 2. For this purpose, clamping screws 5, 5' of different length are used as in the embodiment of FIG. 7. During the disassembly, one must accordingly also proceed in two steps. In the first step the inner conical ring 4' is loosened by removing the longer clamping screws 5 or by partially unscrewing them from the threaded bores 17 of the inner conical ring 4'. Using the ejector ring 22, the inner conical ring 4' is then released from out of the bracing. In the second step, the shorter clamping screws 5' which extend through the bores 16 in the inner conical ring 4 that have ejector threads 20 are removed. The remaining shorter clamping screws 5' are loosened, advantageously each by the same amount. Subsequently the conical ring 22 is applied against the screw heads 18 of the loosened shorter damping screws 5', and screwed to the inner conical ring 4 via the ejector screws 21. If the ejector screws 21 are screwed in further, they generate an axially directed force onto the loosened shorter clamping screws 5'. The clamping connection is thus loosened.

Figure 9:
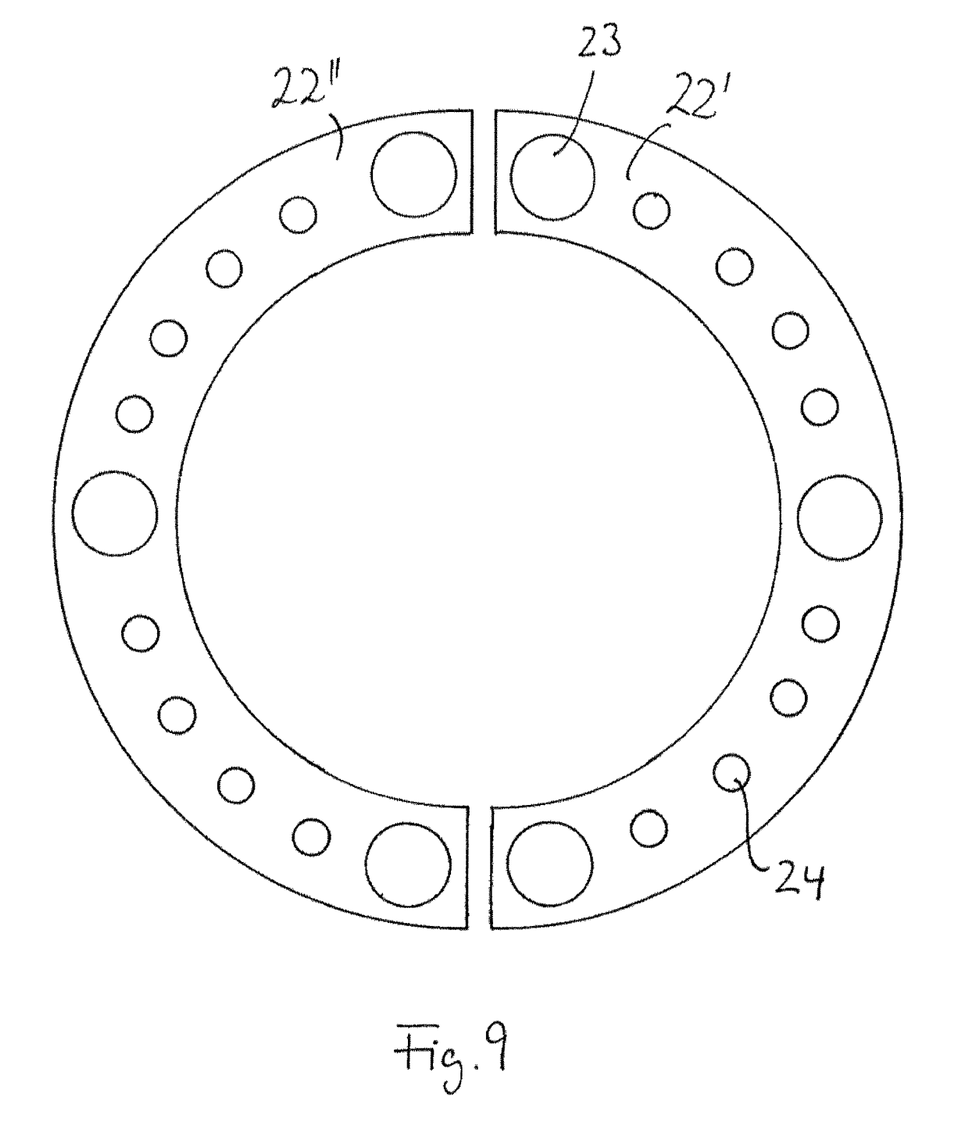
FIG. 9 shows an additional ejector ring in a top view.

The ejector ring 22 can also be designed in two parts, see FIG. 9. Its two halves 22' and 22" can be placed on the shaft 2 from outside. This is advantageous if sliding onto the shaft 2 is impossible due to the circumstances of the construction.

In this case, the bores 23 for the ejector screws are advantageously each provided for the ends of the parts 22', 22". The bores 16 in the ring flange 15 that are aligned with these bores 23 each have an ejector thread 20. As a result, in spite of the equal distribution of the clamping screws 5 along the periphery of the ring flange 15, one ensures that the halves 22', 22" of the ejector ring 22 are evenly mechanically loaded.

Further, while considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A conical ring assembly for a clamping arrangement for a force-fit connection of an outer component arrangement having a recess, to an inner component arrangement, the conical ring assembly comprising a first conical ring and an associated adjacent second conical ring, the first conical ring having a plurality of bores for the leadthrough of a clamping screw which can be screwed to the associated adjacent second conical ring, wherein:
   a first portion of the plurality of bores, for the leadthrough of a clamping screw having a clamping screw thread, have an ejector thread for an ejector screw, the ejector thread being larger than an aligned corresponding screw connection bore in the associated adjacent second conical ring and allowing for both the leadthrough of one of the clamping screws and threaded interengagement with an associated ejector screw wherein the first portion of bores are configured so that the associated ejector screw is configured to abut a wall surface surrounding a corresponding threaded bore of the associated adjacent second conical ring so that the clamping screw and the associated ejector screw are operable in each of the bores in the first portion, and
   wherein a second portion of the plurality of bores lack the ejector thread.

2. The conical ring assembly according to claim 1, wherein the first conical ring is one of an inner and an outer conical ring of the clamping arrangement.

3. The conical ring assembly according to claim 1, wherein the first conical ring further includes a ring flange, the plurality of bores extending through the ring flange.

4. The conical ring assembly according to claim 3, wherein the ring flange extends radially away from an associated inner component arrangement and can be brought to bear axially against an associated outer component arrangement of the clamping arrangement.

5. The conical ring assembly according to claim 3, wherein the ring flange extends in the direction toward an associated inner component arrangement of the clamping arrangement.

6. The conical ring assembly according to claim 1, wherein the second portion includes at least one bore.

7. The conical ring assembly according to claim 6, wherein the first portion of the plurality of bores are equally spaced about the first conical ring.

\* \* \* \* \*